April 22, 1952   H. B. G. CASIMIR   2,593,845
APPARATUS FOR THE ACCELERATION OF ELECTRONS
Filed Nov. 22, 1946
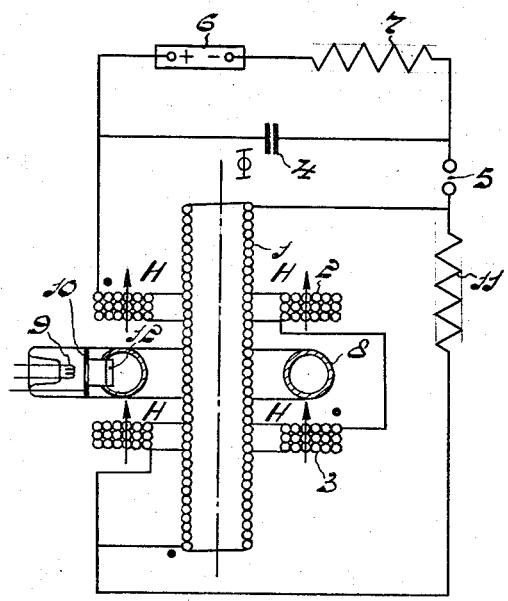
HENDRIK BRUGT GERHARD CASIMIR
INVENTOR
BY
AGENT

UNITED STATES PATENT OFFICE 2,593,845

APPARATUS FOR THE ACCELERATION OF ELECTRONS

Hendrik Brugt Gerhard Casimir, Eindhoven, Netherlands, assignor to Hartford National Bank and Trust Company, Hartford, Conn., as trustee Application November 22, 1946, Serial No. 711,679
In the Netherlands October 18, 1945

Section 1, Public Law 690, August 8, 1946.
Patent expires October 18, 1965

3 Claims. (Cl. 250—27)

It is known that electrically charged particles, for example electrons, can be accelerated in a discharge tube without the need for setting up at the electrodes a voltage corresponding with the velocity to be attained (cf. Dutch Patent 54,683). This is accomplished by causing the acceleration to take place by means of an electrical force which is generated in the discharge tube itself by a varying magnetic field. If the particles are caused to traverse an annular path, both an accelerating magnetic field and a controlling field are needed, the latter being applied to keep the particles in their path. The accelerating field is surrounded by the path for the particles, whereas the lines of force of the controlling field must be intersected by it.

Furthermore it is known to generate in such an "induction accelerator" the two magnetic fields with the aid of a single magnetic yoke, the pole shoes of this yoke being formed in such manner that a field of variable strength is produced, the field strength of which radially decreases from a central zone. The peripheral part of this field which comprises the annular electronic tube arranged coaxially of the field, serves to control the electrons. In this device the electrons move, under definite conditions which can be deduced mathematically, in a circular path which they keep following independently of their velocity and to which they return if they are deflected for some reason or other (for example upon collision with other particles).

The iron body consisting of yoke and pole shoes and used for the generation of the fields, has a considerable weight, but it is indispensable to keep the strength of the current to be delivered by the mains or a generator within reasonable limits and yet to produce very high magnetic field strength which is required to obtain energy of some magnitude in the discharge path. This disadvantage must be accepted since the very large number of ampère-turns which an ironless circuit would require, immediately eliminates the idea to render the device smaller, lighter and cheaper by the absence of iron.

According to the invention this measure is nevertheless taken and this as a result of the recognition that an increase of the number of ampère-turns is indeed possible by employing a very great current strength. The invention is based on the realisation that, as far as the coil system is concerned, the very strong current required by an ironless circuit, is not very objectionable if it is of a short duration only. This recognition alone is not sufficient to solve the problem, for even in the case of a very short duration the high power imposes definite conditions upon the mains. According to the invention these difficulties are obviated by supplying the current to the coils in form of a damped high-frequency oscillation of an electric charge. Such an oscillation is obtainable by taking the current from a previously charged condenser.

The idea of obtaining, by means of a condenser, a strong current having a comparatively low power to be supplied by the mains is not new in itself and has already been applied, for example to X-ray apparatus. For an induction accelerator comprising an energizing system having iron pole shoes it has little advantage.

The time between two oscillations, which is very long in comparison with that in which the field gives off energy to the electrons, can be used to recharge the condenser by a continuously active voltage. For the repeated charge and discharge of a condenser use may be made of a switch which is automatically closed as soon as the charge of the condenser is completed and which is opened again when the condenser has been discharged. In a simple form of construction such a switch is constituted by an ionisation bridge, i. e. a gasfilled discharge tube having a glow or arc discharge or by a spark gap.

The required variability of the field may be obtained by surrounding a coil, which partly generates the acceleration field, by an annular electronic tube and by arranging on either side thereof auxiliary coils which generate a magnetic field, the lines of force of which intersect the electronic tube, this field serving in part for accelerating and in part for controlling the electrons.

It is not sufficient to impart a rapid velocity to the electrons; they must eventually strike a target disc. It is therefore necessary to force them out of their path at the moment at which the accelerating action ceases thus allowing them to strike the target. This is effected in conventional apparatus by providing that the portion of the pole shoes through which the flux of the controlling field passes is saturated sooner than the central portion of the pole shoes, so that at a given moment the field in the latter portion increases to a greater extent than in the former portion and the electrons therefore leave their circular path and strike the target.

A similar effect can be achieved in the apparatus according to the invention by causing a phase displacement between the current in the central coil and the current in the auxiliary coils.

If the former current is caused to lag with respect to the latter current, after an approximately equal initial increase in both there results a decrease in the field strength of the auxiliary coils while the field of the central coil is still increasing at the same speed. As soon as this occurs the conditions under which the electrons are maintained in their initial circular orbit are no longer fulfilled, one of these conditions being that the total flux embraced is twice as strong as it would be in a homogeneous field having a strength equal to that at the path under consideration. When the difference in strength of the field variations becomes perceptible, the electrons tend to follow an orbit of gradually increasing radius which finally intersects an anode in the tube.

In order that the invention may be clearly understood and readily carried into effect, it will now be described more fully with reference to the accompanying drawing, in which one form of construction comprising the circuit-arrangement is diagrammatically represented by way of example.

A central coil 1 and two auxiliary coils 2 and 3 are all connected in series and connected to a condenser 4 through a spark gap 5. The coils are wound in such manner that their magnetic fields are additive. The condenser 4 is charged by a direct current supply 6 through a resistance 7. As soon as the voltage at the condenser attains the breakdown voltage of the spark gap 5, the condenser discharges through the coils. The oscillation occurring is comparatively rapidly damped, after which the condenser is charged again, so that the discharge is constantly repeated with a frequency, for example 10 per second, which is variable by the choice of resistance 7.

The current increases very rapidly and since it is limited only by a very low resistance, it attains a very high value. However, the charge of the condenser is limited, so that the current has a short duration. Thus a strong current can flow without excessive heating of the coils. In the circuit a high-frequency oscillation occurs which, however, is strongly damped and decays after a few cycles.

Owing to the rapid increase of the current during a quarter period of the oscillation, which may last $\frac{1}{4} \times 10^{-5}$ second, and consequently of the magnetic field, an electric field is produced about the coils during a very short time, which field, due to its high strength and the strong increase of the current, is capable of imparting a high velocity to the electrons in the annular discharge tube 8. The electrons are emitted by an incandescent cathode 9 provided in a side tube, and are introduced into the discharge space by a weak electric field set up between this cathode and an auxiliary anode 10 which is provided with an aperture.

The electric force resulting from the rapid increase of the magnetic field coils 1, 2 and 3 is tangentially directed, so that the electrons in the tube 8 move in an orbit which is concentric with the coils.

The radius $r$ of this orbit is determined by the condition that the flux embraced by the orbit is twice the field strength $br$ at the electron orbit multiplied by the area of the circle and consequently depends upon the ratio between the field strength at an arbitrary point and that in the axis of the coils. As long as this ratio remains constant, the path of the electrons does not vary.

The field obtained during the first rising part of the curve must increase to such an extent that the electrons attain the desired final velocity. On attaining the highest value of the current strength the electric force has again dropped to zero; after that it reverses its polarity. If the damping is not excessively strong a useful acceleration can likewise be obtained in one or more subsequent periods, though the velocity is somewhat lower than the first time. At any rate each time the electrons must strike the target prior to a decrease in current strength. For this reason a resistance 11 is connected in parallel with the central coil 1, which resistance results in a certain phase displacement between the current in coil 1 and that in coils 2 and 3. Consequently, the current in the central coil is caused to lag behind the current in the auxiliary coils so that the field produced by the control and auxiliary coils decreases radially from the center of the discharge path outwardly as the field at the center attains a maximum value, or at the moment when the electric force is zero. As a result, the radius of the electron orbit determined by the relation $\phi = 2\pi r^2 br$, becomes larger and the electrons, travelling in orbits of continually increasing radius, strikes the target 12 at the moment at which they attain their highest velocity thus producing very hard X-rays. The device described may consequently serve for irradiation purposes.

In order to obtain satisfactory operation of the device, it is not only necessary to satisfy the condition that the ratio between the actual flux produced and that which would be produced by a uniform field be such that the electrons travel in orbits of ever increasing radius as the field reaches a maximum strength but it is also necessary for orbital stability, i. e. the electrons remain in stable orbits and not strike the walls of the tube, that the field strength in the proximity should gradually decrease so that the product of the field strength and radius does not increase with an increasing radius.

It has been found that by the arrangement of the coils as shown in the figure this condition can be fulfilled, so that in this way the large iron mass required in the conventional apparatus in this field can be dispensed with and the size of the assembly can be considerably reduced.

What I claim is:

1. An electron induction accelerator comprising an annular discharge tube providing a discharge path for electrons, a first air-cored inductance coil surrounded by said annular discharge tube for accelerating electrons, a second air-cored coil having two spaced apart portions on opposing sides and co-extensive with said discharge tube and coaxial therewith for accelerating and controlling the electrons, means to generate a high-frequency damped oscillatory current, and means to connect said coils to said generating means to excite said coils and generate fields which accelerate and control the electrons in said discharge path.

2. An electron induction accelerator comprising an annular discharge tube providing a discharge path for electrons, a first air-cored inductance coil surrounded by said annular discharge tube for accelerating electrons, a second air-cored coil having two spaced apart portions on opposing sides of and coextensive with said discharge tube and coaxial therewith for accelerating and controlling the electrons, a capacitor in series relationship with said coils, means to continuously charge said capacitor at a constant voltage, and means to periodically discharge said capacitor through said coils.

3. An electron accelerator comprising an annular discharge tube providing a discharge path for electrons, a first air-cored inductance coil surrounded by said annular discharge tube for accelerating electrons, a second air-cored coil having two spaced apart portions on opposing sides of and coextensive with said discharge tube and coaxial therewith for accelerating and controlling the electrons, a capacitor in series relationship with said coils for energizing said coils with current therefrom, means to continuously charge said capacitor at a constant voltage, means to periodically discharge said capacitor through said coils, and means for applying to said first coil current in lagging phase relationship with the current in said second coil.

HENDRIK BRUGT GERHARD CASIMIR.

REFERENCES CITED

The following references are of record in the file of this patent:

UNITED STATES PATENTS

| Number | Name | Date |
| --- | --- | --- |
| 2,103,303 | Steenbeck | Dec. 28, 1937 |